United States Patent
Harris et al.

(10) Patent No.: US 8,498,383 B2
(45) Date of Patent: Jul. 30, 2013

(54) MEDIA RELAY SERVICE

(75) Inventors: John Harris, Clearwater, FL (US); Geoffrey Stuart Lanotte, Tampa, FL (US)

(73) Assignee: CSDVRS, LLC, Clearwater, FL (US)

( * ) Notice: Subject to any disclaimer, the term of this patent is extended or adjusted under 35 U.S.C. 154(b) by 173 days.

(21) Appl. No.: 13/092,338

(22) Filed: Apr. 22, 2011

(65) Prior Publication Data

US 2012/0269331 A1  Oct. 25, 2012

(51) Int. Cl.
*H04M 11/00*  (2006.01)

(52) U.S. Cl.
USPC ............................................. 379/52

(58) Field of Classification Search
USPC ............................................. 379/52
See application file for complete search history.

(56) References Cited

U.S. PATENT DOCUMENTS

| | | | |
|---|---|---|---|
| 7,206,386 B2 | 4/2007 | Clapp et al. | |
| 7,746,985 B2 | 6/2010 | Armstrong et al. | |
| 2007/0064888 A1* | 3/2007 | Nola et al. | 379/93.15 |
| 2008/0043936 A1* | 2/2008 | Liebermann | 379/52 |
| 2008/0267361 A1* | 10/2008 | Dileo | 379/52 |
| 2012/0302269 A1* | 11/2012 | Gould et al. | 455/466 |

* cited by examiner

*Primary Examiner* — Creighton Smith
(74) *Attorney, Agent, or Firm* — Thomas|Horstemeyer, LLP

(57) ABSTRACT

Disclosed are various embodiments for a call control application bridges communication devices with a media call. In one embodiment, the call control application receives a request to place a media call from a source device to a destination device. The call control application determines if at least one of the source device and the destination device is associated with a telephone number registered in a relay registry. In response to a determination that the telephone number is registered in the registry, the call control application directs an intermediary agent to place a first media call to the source device and a second media call to the destination device. The call control application then bridges the first media call and the second media call via the intermediary agent.

25 Claims, 5 Drawing Sheets

MEDIA RELAY SERVICE

BACKGROUND

Users can communicate with each other on electronic communication devices such as telephones, cellular phones, smart phones, computers and/or other such devices. For example, a user can dial a phone number or some other unique identifier to be in direct communication with another user. However, a deaf and/or hard-of-hearing person may find it difficult to use a traditional communication device such as a telephone and/or a cellular phone. For instance, the deaf and/or hard-of-hearing person is hearing-impaired and thus would not be able to effectively communicate with a hearing-enabled person over a telephone. Additionally, in some instances, a hearing-impaired person communicates exclusively using sign language. As such, a telephone and/or a cellular phone is not an effective device for a hearing-impaired person.

SUMMARY OF INVENTION

Disclosed are embodiments for a non-transitory computer-readable medium embodying a program executable that comprises code that receives an electronic request to place a media call, code that determines whether either the source device or the destination device is registered in a relay registry, code that employs an intermediary agent to originate a first media call to the source device and a second media call to the destination device, and code that bridges the first media call and the second media call to form a connection between the source device, destination device and the intermediary agent.

Further, disclosed are embodiments for a system having a computing device that includes a call control executable comprising logic that receives a request from a source device to place a call to a destination device, logic that determines whether either the source device or the destination device is associated with a telephone number registered in a relay registry, logic that originates a call to the source device and the destination device, and logic that connects the source device and the destination device based on a location of a impaired user with respect to the source device and the destination device.

Additionally, disclosed are embodiments for method comprising receiving in a call control from a source device an electronic request to place a video call to a destination device, determining if at least one of the source device and the destination device is associated with a telephone number registered in a relay registry, originating a first video call to the source device and a second video call to the destination device in response to the determination, and bridging the first video call with the second video call.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are embodiments for connecting a source device and a destination device with a media call where at least one of the users of the source device and the destination device is deaf and/or hard-of-hearing (hereinafter "hearing-impaired"). In the following discussion, a general description of the system and its components is provided, followed by a discussion of the operation of the same.

U.S. Pat. Nos. 7,206,386 entitled "Method and System for Electronic Communication with the Hearing Impaired," 7,746,984 entitled "Method and System for Call Initiation in a Video Relay Service," and 7,746,985 entitled "Method, System and Device for Relay Call Transfer Service" are incorporated herein by reference. As described in these patents, a video relay service can be utilized to aid hearing-impaired telephone users to communicate with hearing-capable users. For instance, as described in the above-listed patents, a video relay service can establish a first communication with a first device with a voice phone and establish a second communication with a second device. Thus, the video relay service described in the above-listed patents, establishes two separate communication connections.

Figure 1:
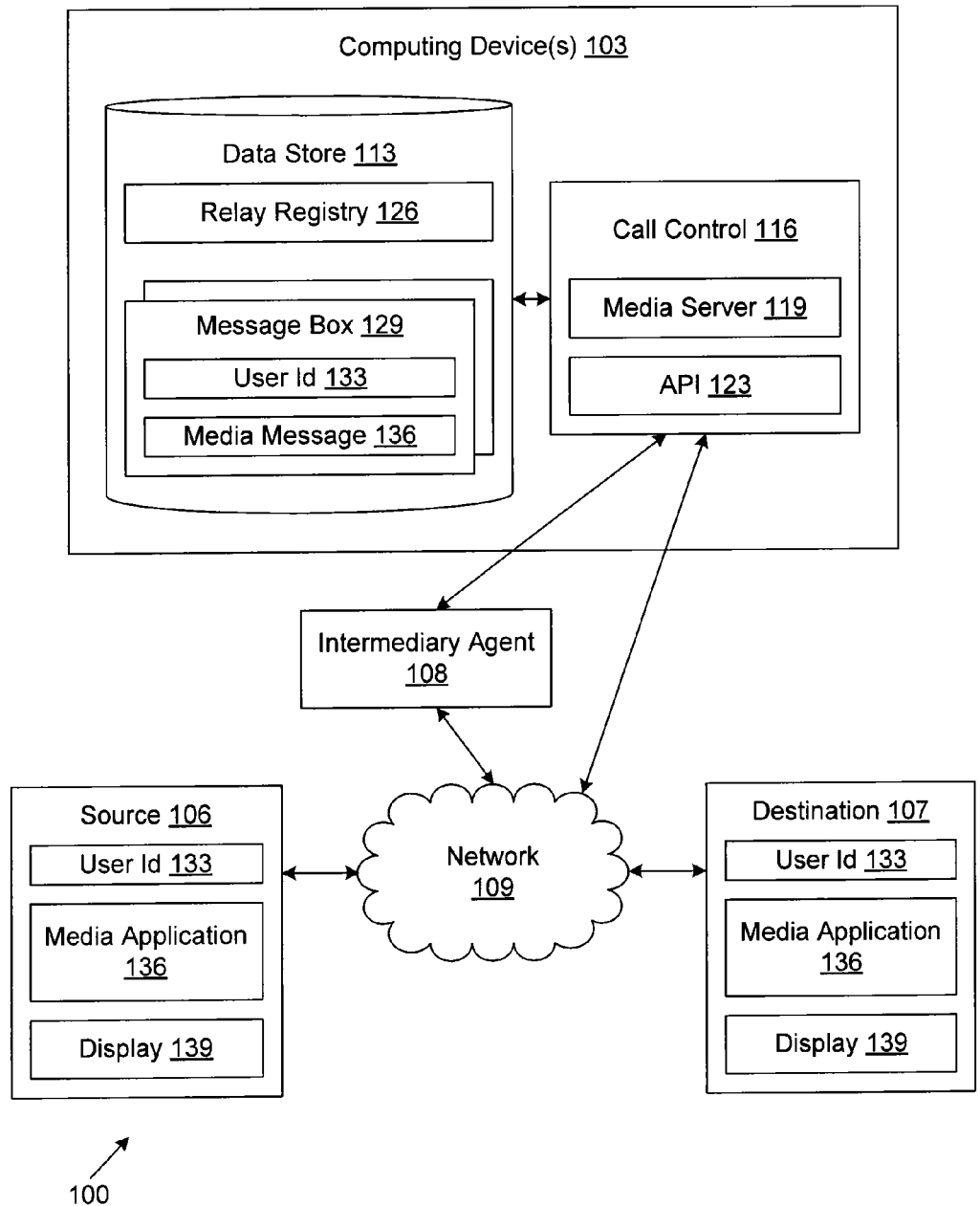
FIG. 1 is a drawing of a networked environment according to various embodiments of the present disclosure.

With reference to FIG. 1, shown is a networked environment 100 according to various embodiments. The networked environment 100 includes a computing device 103, a source device 106, a destination device 107, an intermediary agent 108 and a network 109. The network 109 includes, for example, the Internet, intranets, extranets, wide area networks (WANs), local area networks (LANs), wired networks, wireless networks, or other suitable networks, etc., or any combination of two or more such networks. In addition, the network 109 may also include public switch telephone lines and radio networks such as, mobile phone networks, cellular networks, and/or other suitable radio networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include call control 116, and other applications, services, processes, systems, engines, or functionality not discussed in detail herein. The call control 116 processes and executes requests for media calls from a source device to a destination device. In one embodiment, the call control 116 may include a media server 119 and an application programming interface ("API") 123. For example, the media server 119 interfaces with communication devices such as, the source device 106, the destination device 107, one or more intermediary agents 108, and/or any other communication device that may be accessible via the network 109, as will be described. Additionally, the API 123 may determine whether the communication devices and/or users on the communication devices are registered with a relay registry.

The data stored in the data store 113 includes, for example, a relay registry 126 and a message box 129, and potentially other data. In one embodiment, the relay registry 126 may be a hearing-impaired registry, such as, the Internet-based Telecommunications Relay Service (iTRS) database, that maintains a listing of hearing-impaired telephone users. For instance, the relay registry 126 may identify users by telephone number, user identification, and/or any other type of unique user identifier. Additionally, the message box 129 stores media message(s) 136 for users of the communication devices having a unique user id 133. In one embodiment, the media message 136 may be a video message, an audio message, a picture message, a holographic message, and/or any other type of media message.

The source device 106 and the destination device 107 are representative of a plurality of communication devices that may be coupled to the network 109. The communication devices may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The source device 106 and the destination device 107 may be configured to execute various applications such as a media application 136 and/or other applications. The media application 136 may be executed in a communication device, for example, to create, transmit, receive, and/or process media, such as video files, audio files, picture files, and/or other types of media. In one embodiment, the media application 136 may be associated with a camera, a digital camera, a digital video camera, a webcam, a microphone and/or any other type of media capturing device. Additionally, the source device 106 and the destination device 107 may each include a display 139 that depicts and/or plays the media processed by the media application 136. For instance, the media application 136 may render a video on the display 139. The communication device may be configured to execute applications beyond media application 136 such as, for example, email applications, instant message applications, and/or other applications.

The intermediary agent 108 is an intermediary between the source device 106, the destination device 107, the computing device 103, and/or any other communication device that maybe accessible via the network 109. For instance, the intermediary agent 108 may place media calls to the source device 106 and the destination device 107 as directed by the media server 119. Additionally, the intermediary agent 108 is configured to translate from one language to another. For instance, the intermediary agent 108 may translate languages, sign language, English, French, Spanish, Hindi, Chinese, and/or any other spoken language. In one embodiment, the intermediary agent 108 may be a computer system having computing capability. In another embodiment, the intermediary agent 108 may be a human being.

Next, a general description of the operation of the various components of the networked environment 100 is provided. To begin, a user on the source device 106 submits a request to place a media call to the destination device 107. The call control 116 receives and processes the request for the media call and directs the API 123 to determine if a user having a user id 133 on the source device 106 and/or the destination device 107 is registered in the relay registry 126. Upon a determination that a user is registered in the relay registry 126, the call control 116 directs the media server 119 to connect the source device 106 and the destination device 107 with a media call. In one embodiment, the call control 116 may direct the media server 119 to directly connect the source device 106 and the destination device 107, as will be described with respect to FIG. 2. In another embodiment, the call control 116 may direct the media server 119 to connect the source device 106 and the destination device 107 via the intermediary agent 108, as will be described with respect to FIG. 3. In yet another embodiment, the call control 116 may instruct the media server 119 to direct the media call to a message box 129, as will be described with respect to FIG. 4.

Figure 2:
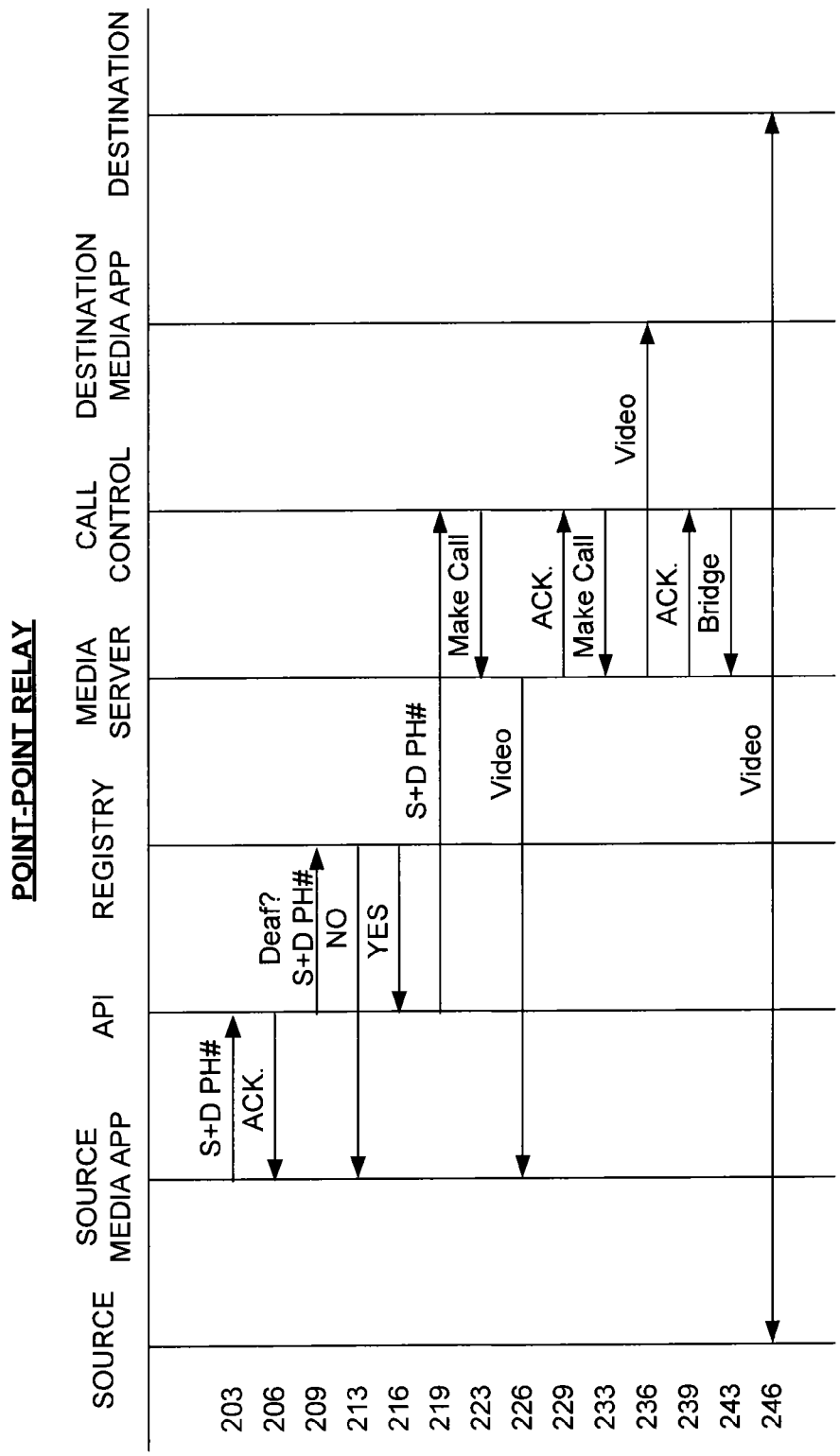
FIGS. 2-4 are flowcharts illustrating examples of functionality implemented as portions of call control software executed in a computing device in the networked environment of FIG. 1 according to various embodiments of the present disclosure.

Referring next to FIG. 2, shown is a flowchart that provides one example of the operation of a portion of the call control 116 according to various embodiments. It is understood that the flowchart of FIG. 2 provides merely an example of the many different types of functional arrangements that may be employed to implement the operation of the portion of the call control 116 as described herein. As an alternative, the flowchart of FIG. 2 may be viewed as depicting an example of steps of a method implemented in the computing device 103 (FIG. 1) according to one or more embodiments.

According to one embodiment, the call control 116 directly connects the source device 106 with the destination device 107 with a media call, such as for instance, a video call. The call control 116 determines if at least one user on the source device 106 and/or destination device 107 is registered in the relay registry 126. Upon making this determination, the call control 116 makes a media call to the source device 106, a media call to the destination device 107, and then bridges the two media calls into one connection.

Beginning with line 203, the call control 116 receives a request for a media call from the media application 136 on the source device 106. For instance, the call control 116 may execute the API 123 to process the request for the media call. In one embodiment, the request may be an electronic request such as an email, a text message, a request made through a browser, a telephone call and/or any other form of electronic communication. The request may contain information identifying the source device 106 and the destination device 107 to which a media call is requested. For instance, the information may include a telephone number for the source device, such as, a mobile phone number and/or a telephone number for a land line. In addition, the information may also include a user id 133 that uniquely identifies the user on the source device 106 and/or the user on destination device 107. Next, in line 206, the API 123 transmits an acknowledgement back to the media application 136 on the source device 106. For instance, the acknowledgement may be an electronic communication such as an email and/or text message that confirms receipt of the request for the media call.

In line 209, the API 123 determines whether the source device 106 and/or the destination device 106 is associated with a telephone number registered in the relay registry 126. Alternatively, the API 123 may also determine if a user on the source device 106 and/or destination device 107 having a user id 133 is registered in the relay registry 126. For example, the relay registry 126 may be the iTRS database and/or any other hearing-impaired registry that documents deaf and/or hard-of-hearing users. In one embodiment, the API 123 gathers the user id(s) 133 included as a parameter in the electronic request for the media call sent by the source device 106 and determines if the user id(s) 133 is found in the relay registry 126. As shown in line 213, the API 123 denies the request for the media call if no user id 133 and/or telephone number associated with the source device 106 and/or the destination device 107 is found in the relay registry 126. For instance, the API 123 may transmit an electronic notification back to the source device 106 denying the request.

Next, in line 216, the API 123 determines that at least one user id 133 and/or telephone number associated with the source device 106 and/or the destination device 107 is found in the relay registry 126. In line 219, responsive to this determination, the API 123 passes the parameters included in the request for the media call onto the call control 116. For instance, the parameters may include a telephone number, user id 133, and/or any other type of parameter for the source device 106 and/or the destination device 107.

Upon receiving the parameters, the call control 116 directs the media server 119 to first make a media call to the source device 106 as shown in line 223. In one embodiment, the media server 119 makes a media call using a telephone number that may be included in the parameters of the request. For instance, the media server 119 may make a video call to the telephone number where the source device 106 is a video phone. A media application 136 on the source device 106 may respond to video call made by the media server 119. In another embodiment, the media server 119 may determine contact information for the source device 106 with the user id 133. For instance, the media server 119 may determine an internet protocol (IP) address for the source device 106 from the user id 133 that can be used to initiate a video call with the source device 106. Having made the media call to the source device 106, the media server 119 notifies the call control 116 that a successful connection with the source device 106 has been made, as shown by line 229.

In line 233, the call control 116 directs the media server 119 to make a media call to the destination device 107. As seen by line 236, the media server 119 makes a media call, such as a video call, to the destination device 107. For instance, the media server 119 may make the call using the parameters included in the request for the media call, such as a telephone number associated with the destination device 107 and/or a user id 133 of a user on the destination device 107. A media application 136 on the destination device 107 may receive the video call made by the media server 119. Having made the media call to the destination device 107, the media server 119 notifies the call control 116 that a successful connection with the destination device 107 has been made, as shown by line 239.

Next, in line 243, the call control 116 sends a command to the media server 119 to bridge the two media calls made to the source device 106 and the destination device 107. As shown by line 246, the media server 119 bridges the two media calls forming a direct connection between the source device 106 and the destination device 107. For example, the video call between the media server 119 and the source device 106 is bridged with the video call between the media server 119 and the destination device 107.

Figure 3:
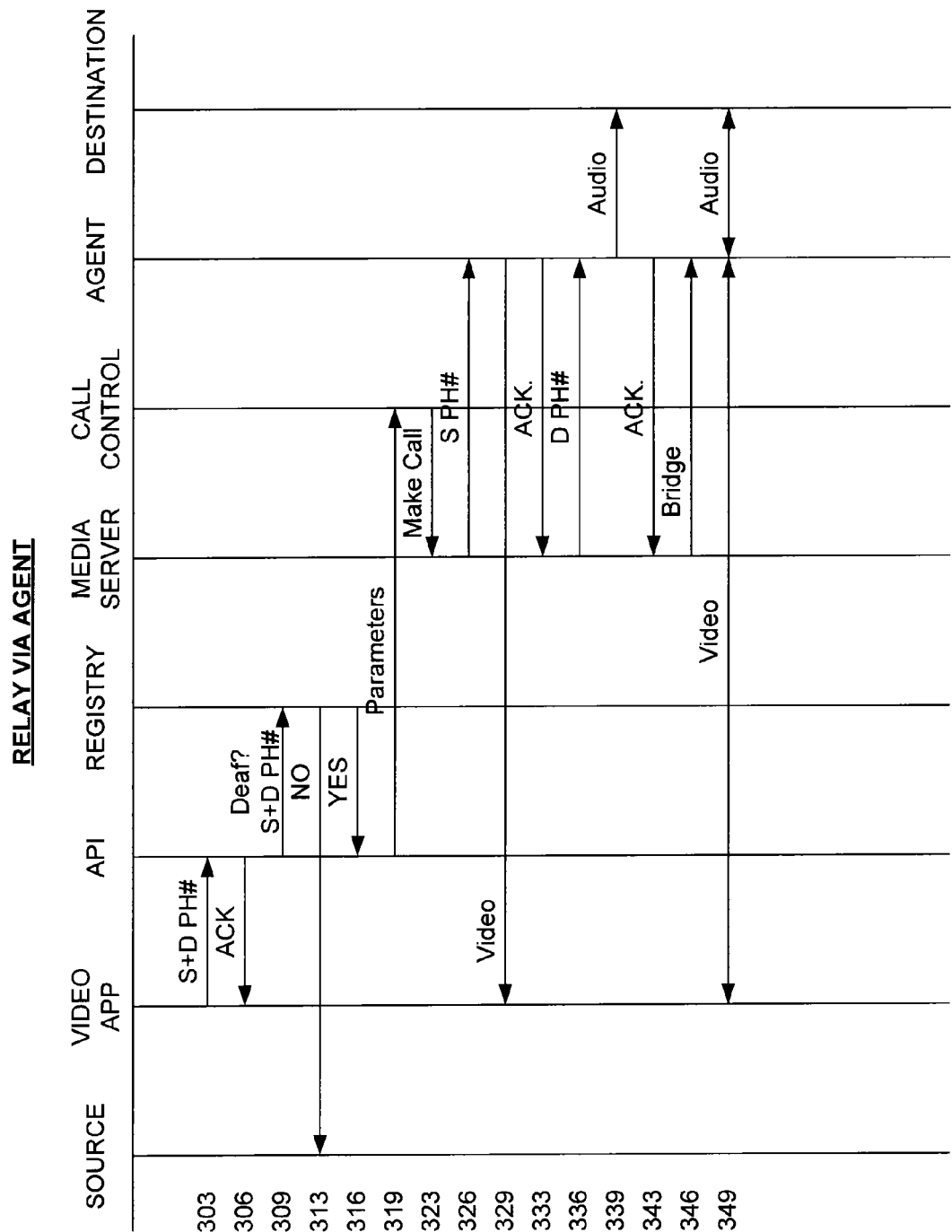

Moving now to FIG. 3, shown is a flowchart that provides one example of the operation of a portion of the call control 116 according to various embodiments. It is understood that the flowchart of FIG. 3 provides merely an example of the many different types of functional arrangements that may be employed to implement the operation of the portion of the call control 116 as described herein. As an alternative, the flowchart of FIG. 3 may be viewed as depicting an example of steps of a method implemented in the computing device 103 (FIG. 1) according to one or more embodiments.

According to one embodiment, the call control 116 connects the source device 106 with the destination device 107 with a media call, such as for instance, a video call, through an intermediary agent 108. The call control 116 determines if at least one user on the source device 106 and/or destination device 107 is registered in the relay registry 126. Upon making this determination, the call control 116 makes a media call to the intermediary agent 108, a media call to the source device 106, a media call to the destination device 107, and then bridges the media calls into one media call.

Beginning with line 303, the call control 116 receives a request for a media call from the media application 136 on the source device 106 to a destination device 107. For instance, the call control 116 may execute the API 123 to process the request for the media call. In one embodiment, the request may be an electronic request such as an email, a text message, and/or any other form of electronic communication. The request may contain parameters containing identifying information for the source device 106 and the destination device 107. For instance, the parameters may include a telephone number for the source device, such as, a mobile phone number and/or a telephone number for a land line. In addition, the information may also include a user id 133 that uniquely identifies the user on the source device 106 and/or the user on destination device 107. Next, in line 306, the API 123 transmits an acknowledgement back to the media application 136 on the source device 106. For instance, the acknowledgement may be an electronic communication such as an email and/or text message that confirms receipt of the request for the media call.

In line 309, the API 123 determines whether the source device 106 and/or the destination device 106 is associated with a telephone number registered in the relay registry 126. Alternatively, the API 123 may determine if a user on the source device 106 and/or destination device 107 having a user id 133 is registered in the relay registry 126, as described above with respect to FIG. 2. In one embodiment, the API 123 gathers the user id(s) 133 included as a parameter in the request for the media call and determines if the user id(s) 133 is found in the relay registry 126. As shown in line 313, the API 123 denies the request for the media call if no user id 133 and/or telephone number associated with the source device 106 and/or the destination device 107 is found in the relay registry 126, as described above with respect to FIG. 2.

Next, in line 316, the API 123 determines that at least one user id 133 and/or telephone number associated with the source device 106 and/or the destination device 107 is found in the relay registry 126. For instance, the API 123 may determine that the user on the source device 106 is a hearing-impaired user and the user on the destination device 106 is not a hearing-impaired user. In line 319, responsive to this determination, the API 123 passes the parameters included in the request for the media call onto the call control 116. For instance, the parameters may include a telephone number, user id 133, and/or any other type of parameter for the source device 106 and/or the destination device 107.

Upon receiving the parameters, the call control 116 directs the media server 119 to make the media call and execute the request as shown in line 323. The media server 119 directs the intermediary agent 108 to first make a media call to the source device 106 in line 326. For instance, the media server 119 may provide identifying information for the source device 106 to the intermediary agent 108, such as, for instance, a telephone number associated with the source device 106, the user id 133 for a user on the source device 106, and/or any other type of identifying information.

In line 329, the intermediary agent 108 makes a media call to the source device 106. Using the above example, the intermediary agent 108 makes a video call to the source device 106 since the API 123 determined that a hearing-impaired user is on the source device 106. The video call may be received by the media application 136 on the source device 106. In another embodiment, the intermediary agent 108 may make a different type of media call such as, for instance, an audio call, a three-dimensional video call, and/or any other type of media call. Having made the media call to the source device 106, the intermediary agent 108 notifies the media server 116 that a successful media call was executed in line 333. For instance, the intermediary agent 108 may send an electronic notification as an acknowledgement of the media call.

In response to receiving the acknowledgement of line 336, the media server 116 then directs the intermediary agent 108 to make a media call to the destination device 107. For instance, the media server 119 may provide identifying information of the destination device 107 to the intermediary agent 108, such as, for instance, a telephone number associated with the source device 106, the user id 133 for a user on the source device 106, and/or any other type of identifying information.

In line 339, the intermediary agent 108 makes a media call to the destination device 107. Using the above example, the intermediary agent 108 makes an audio call to the destination device 107 since the API 123 determined that a hearing-impaired user is not on the destination device 107. The audio call may be received by the media application 136 on the destination device 107. In another embodiment, the intermediary agent 108 may make a different type of media call such as, for instance, a video call, and/or any other type of media call. Having made the media call to the destination device 107, the intermediary agent 108 notifies the media server 116 that a successful media call was executed in line 343. For instance, the intermediary agent 108 may send an electronic notification as an acknowledgement of the media call.

Having received acknowledgements of media calls made by the intermediary agent 108 to the source device 106 and the destination device 107, the media server 119 then directs the intermediary agent to bridge the two media calls as seen in line 346. As shown by line 349, the intermediary agent 108 then bridges the two media calls forming one connection where the user on the source device 106 is connected to the user on the destination device 107 through the intermediary agent 108. Using the above example, the hearing-impaired user on the source device 106 communicates with the intermediary agent 108 via the video call. For instance, the hearing-impaired user may communicate using sign language. The user on the destination device 107 communicates with the intermediary agent 108 via the audio call, for instance, the user may communicate using normal speech. In one embodiment, the intermediary agent 108 translates the sign language used to communicate with the hearing-impaired user on the source device 106 to the speech used to communicate with the user on the destination device 106, and vice versa.

In one embodiment, the video call to the source device 106 and the audio call to the destination device 107 may not be bridged to form one connection. For instance, the intermediary agent 108 may maintain the two media calls separately where the intermediary agent 108 serves to translate the sign language to speech, and vice versa. Additionally, the media application on the source device 106 and/or the destination device 107 may be a proprietary application that precludes the ability to bridge with another media call. For instance, the media application on the source device 106 and/or the destination device 107 may be Apple Inc.'s FaceTime®.

Figure 4:
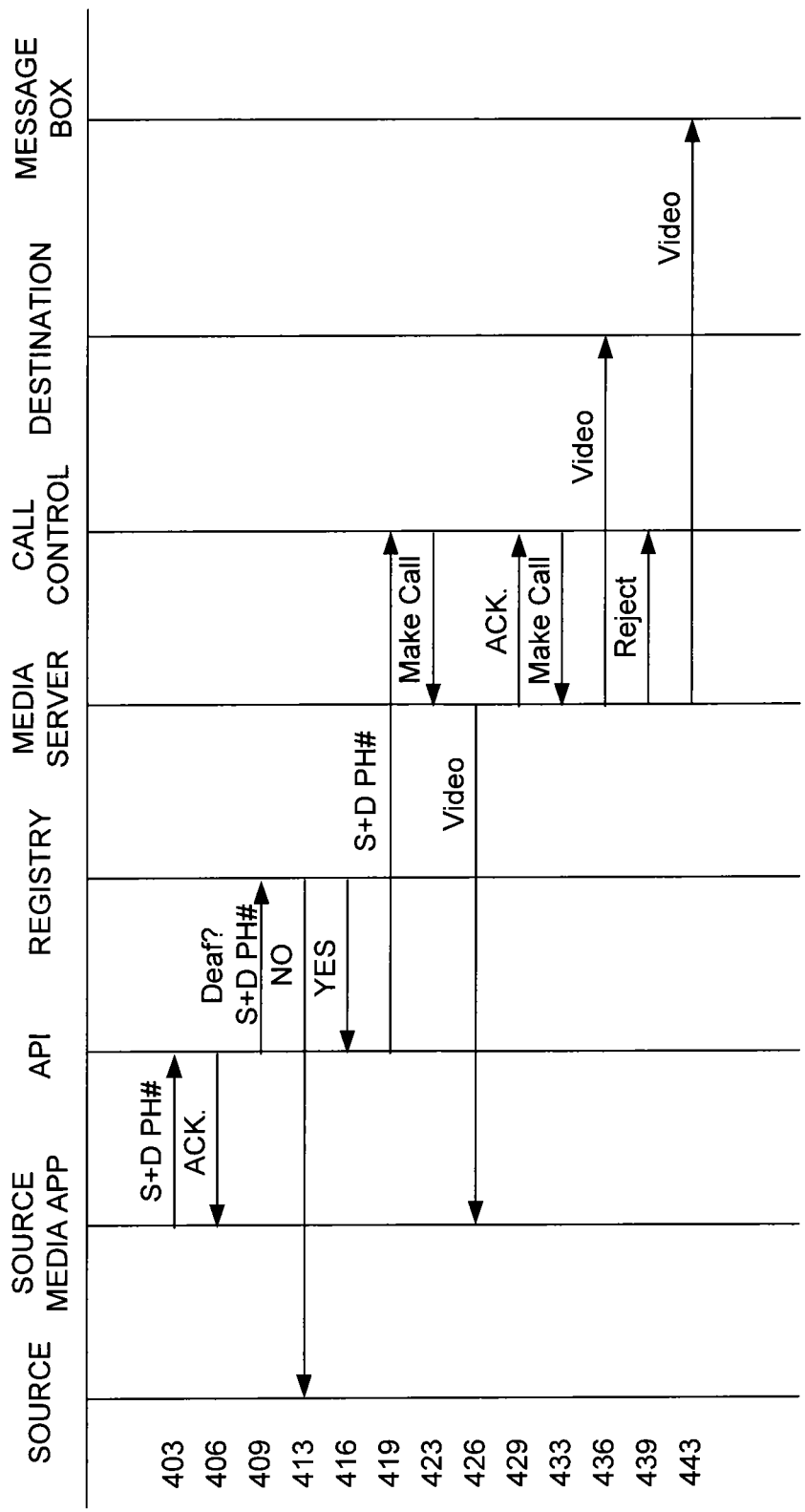

Moving now to FIG. 4, shown is a flowchart that provides one example of the operation of a portion of the call control 116 according to various embodiments. It is understood that the flowchart of FIG. 4 provides merely an example of the many different types of functional arrangements that may be employed to implement the operation of the portion of the call control 116 as described herein. As an alternative, the flowchart of FIG. 4 may be viewed as depicting an example of steps of a method implemented in the computing device 103 (FIG. 1) according to one or more embodiments.

According to one embodiment, the call control 116 directs the source device 106 to a message box for the user on destination device 107. The call control 116 determines if at least one user on the source device 106 and/or destination device 107 is registered in the relay registry 126. Upon making this determination, the call control 116 makes a media call to the destination device 107. However, if a reject and/or redirect request is received from the destination device 107, the call control directs the user on the source device 106 to a message box associated with the user on the destination device 107.

Lines 403 through lines 436 correspond substantially with lines 203 through 236 from FIG. 2. As discussed above, the call control 116 receives a request to place a media call from the source device 106 to the destination device 107. After determining that at least one user on the source device 106 and/or the destination device 107 is registered in the relay registry 126, the call control 116 directs the media server 119 to first place a media call to the source device 106, shown in line 426, and then place a media call to the destination device 107, shown in line 436. However, as shown in line 439, the user on the destination device 107 may reject and/or request to redirect the media call from the media server 119. The media server 119 notifies the call control 116 of the rejected and/or redirected call and connects the user on the source device 106 to the message box 129 of the user on the destination device 107. For instance, the media server may determine the user id 133 of the user on the destination device 107 and connect the user on the source device 106 to the corresponding message box. In one embodiment, the user on the source device 106 may leave a media message 136 to the user on the destination device 107. For example, the media message 136 may comprise a video message, an audio message, and/or any other type of media message.

Figure 5:
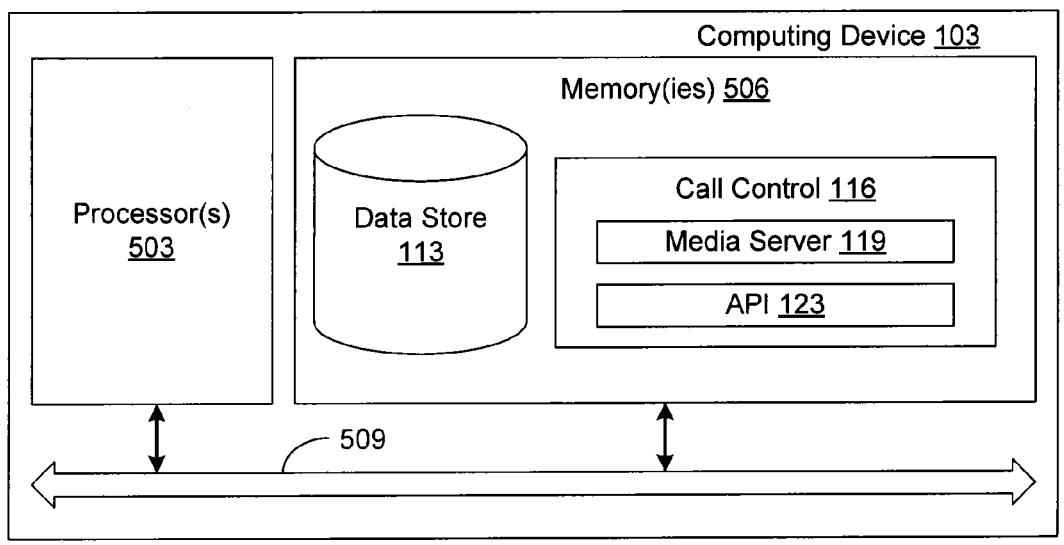
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 103 according to an embodiment of the present disclosure. The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the call control 116, the media server 119, the API 123, and potentially other applications. Also stored in the memory 506 may be a data store 113 and other data. In addition, an operating system may be stored in the memory 506 and executable by the processor 503.

It is understood that there may be other applications that are stored in the memory 506 and are executable by the processors 503 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and the memory 506 may represent multiple memories 506 that operate in parallel processing circuits, respectively. In such a case, the local interface 509 may be an appropriate network 109 (FIG. 1) that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the call control 116, the media server 119, the API 123, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2-4 show the functionality and operation of an implementation of portions of the call control 116. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the call control 116, the media server 119, and the API 123, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that receives an electronic request to place a call from a source device to a destination device;
   code that determines whether at least one of the source device and the destination device is associated with a telephone number that is registered in a relay registry;
   code that transmits a plurality of parameters included in the electronic request to an intermediary agent in response to the determination that the telephone number is registered in the relay registry, the parameters comprising at least the telephone number for the source device and the telephone number for the destination device;
   code that originates a first media call from the intermediary agent to the source device;
   code that originates a second media call from the intermediary agent to the destination device; and
   code that bridges the first media call and the second media call.

2. The non-transitory computer-readable medium of claim 1, wherein the relay registry is an Internet-based Telecommunications Relay Service (iTRS) database.

3. The non-transitory computer-readable medium of claim 1, wherein the intermediary agent translates between a first language being used in the first media call and a second language being used in the second media call.

4. A system, comprising:
   at least one computing device; and
   a call control application executable in the at least one computing device, the call control application comprising:
      logic that receives a request from a source device to place a media call to a destination device;
      logic that determines whether at least one of the source device and the destination device is associated with a phone number that is registered in a relay registry;
      logic that originates a first media call to the source device and a second media call to the destination device, in response to the determination that the phone number is registered in the relay registry; and
      logic that bridges the first media call and the second media calk based on a location of an impaired user with respect to the source device and the destination device.

5. The system of claim 4, wherein at least one of the source device and the destination device is associated with a public switch telephone number.

6. The system of claim 4, wherein the call control application bridges the first media call and second media call through an intermediary agent.

7. The system of claim 4, wherein the media call comprises at least one of a video call and a telephone call.

8. The system of claim 4, wherein the impaired user is hearing-impaired.

9. The system of claim 4, wherein the call control application further comprises logic that determines a type of media call to originate based at least in part on the location of the impaired user with respect to the source device and the destination device.

10. The system of claim 6, wherein the source device is connected to the intermediary agent with a video call if the impaired user is located at the source device.

11. The system of claim 6, wherein the destination device is connected to the intermediary agent with a video call if the impaired user is located at the destination device.

12. The system of claim 6, wherein the destination device is connected to intermediary agent with an audio call if an unimpaired user is located at the destination device.

13. The system of claim 6, wherein the source device is connected to the intermediary agent with an audio call if an unimpaired user is located at the source device.

14. The system of claim 6, wherein the intermediary agent translates between a spoken language and a sign language.

15. The system of claim 4, further comprising logic that directs the request for the call to a media message box.

16. The system of claim 4, wherein the request comprises at least one of an email, a text message, a telephone call, and a request submitted through a browser.

17. A method, comprising the steps of:
   receiving, in a computing device, an electronic request from a source device to place a video call to a destination device;
   determining, in the computing device, whether at least one of the source device and the destination device is associated with a telephone number registered in a relay registry; and
   originating, in the computing device, a first video call to the source device and a second video call to the destination device in response to the determination that the telephone number is registered in the relay registry.

18. The method of claim 17, further comprising bridging, in the computing device, the first video call and the second video call.

19. The method of claim 17, wherein the source device and the destination device are video phones.

20. The method of claim 17, wherein the electronic request comprises at least one of an email, a text message, and a request submitted through a browser.

21. The method of claim 17, wherein a user on at least one of the source device and the destination device is hearing-impaired.

22. The method of claim 17, wherein a user on at least one of the source device and the destination device is hearing-impaired.

23. The method of claim 17, wherein the video call uses video rendered in a H.323 standardization protocol.

24. The method of claim 17, wherein the call control bridges a source video connection with the source device and a destination video connection with the destination device.

25. The method of claim 17, further comprising directing the request for the video call to a video message box.

* * * * *